US011893113B2

(12) United States Patent
Davidovich et al.

(10) Patent No.: US 11,893,113 B2
(45) Date of Patent: Feb. 6, 2024

(54) RETURN-ORIENTED PROGRAMMING PROTECTION

(71) Applicant: C2A-SEC, LTD., Jerusalem (IL)

(72) Inventors: Yitzhack Davidovich, Jerusalem (IL); Yoav Fuchs, Har Gillo (IL); Nir Brakha, Tel Aviv (IL)

(73) Assignee: C2A-SEC, Ltd., Jerusalem (IL)

( * ) Notice: Subject to any disclaimer, the term of this patent is extended or adjusted under 35 U.S.C. 154(b) by 342 days.

(21) Appl. No.: 17/289,821

(22) PCT Filed: Nov. 1, 2019

(86) PCT No.: PCT/IL2019/051192
§ 371 (c)(1),
(2) Date: Apr. 29, 2021

(87) PCT Pub. No.: WO2020/095295
PCT Pub. Date: May 14, 2020

(65) Prior Publication Data
US 2021/0397705 A1 Dec. 23, 2021

Related U.S. Application Data

(60) Provisional application No. 62/756,595, filed on Nov. 7, 2018.

(51) Int. Cl.
*G06F 21/00* (2013.01)
*G06F 21/55* (2013.01)
*G06F 21/54* (2013.01)

(52) U.S. Cl.
CPC ............ *G06F 21/554* (2013.01); *G06F 21/54* (2013.01)

(58) Field of Classification Search
CPC .............................. G06F 21/54; G06F 21/554
(Continued)

(56) References Cited

U.S. PATENT DOCUMENTS

2006/0176822 A1* 8/2006 Doyle ..................... H04L 69/40
370/392
2014/0283040 A1* 9/2014 Wilkerson ............ G06F 12/145
726/22

(Continued)

FOREIGN PATENT DOCUMENTS

| WO | 2013109546 A1 | 7/2013 |
| WO | 2016094152 A1 | 6/2016 |
| WO | 2018037397 A1 | 3/2018 |

OTHER PUBLICATIONS

Li et al., "Defeating return-oriented rootkits with return-less kernels", Computer Systems, ACM, 2 Penn plaza, Suite 701, NY, NY, USA, Apr. 13, 2010, pp. 195-208.
(Continued)

*Primary Examiner* — Josnel Jeudy
(74) *Attorney, Agent, or Firm* — Webb and Co., Ltd.

(57) ABSTRACT

An ROP attack protection apparatus constituted of: a first region of memory having stored therein a protection function, the first region of memory set as executable; and a second region of memory having stored thereon a plurality of operation functions, the second region of memory set as non-executable, wherein the protection function is arranged to: responsive to a call to one of the plurality of operation functions and further responsive to at least one predetermined rule, allow execution of the called operation function; and after receiving a return from the executed operation function, set the executed operation function as non-executable.

14 Claims, 3 Drawing Sheets

(58) Field of Classification Search
USPC .......................................................... 726/23
See application file for complete search history.

(56) References Cited

U.S. PATENT DOCUMENTS

| | | |
|---|---|---|
| 2016/0180081 A1 | 6/2016 | Guidry |
| 2017/0116418 A1 | 4/2017 | Shanmugavelayutham |
| 2018/0046804 A1* | 2/2018 | Lee .......................... G06F 21/57 |
| 2019/0095612 A1* | 3/2019 | Singh ....................... G06F 21/56 |
| 2021/0389965 A1* | 12/2021 | Dabak ...................... G06F 21/53 |

OTHER PUBLICATIONS

Onarlioglu et al., "G-Free", Proccedings of the 26th annual computer security applications conference on ACSAC '10, Dec. 6-10, 2010, Austin, Texas, USA, ACM Press, NY, NY, USA, Dec. 6, 2010, pp. 49-58.

* cited by examiner

RETURN-ORIENTED PROGRAMMING PROTECTION

TECHNICAL FIELD

The invention relates generally to the field of security devices, and more specifically a system and method for protecting against return-oriented programming (ROP) attacks.

BACKGROUND

ROP is a computer security exploit technique which allows an attacker to execute malicious code even in the presence of security defenses such as executable space protection and code signing. With ROP, the attacker gains control of the call stack and hijacks the program control flow. The attacker can then execute carefully chosen machine instruction sequences which are already present in the device's memory. These sequences are called 'gadgets'. Each gadget typically ends in a return instruction and is located in a subroutine within the existing program and/or in a shared library code. Chained together, these gadgets allow an attacker to perform arbitrary operations even in a device employing defenses which can thwart simpler attacks.

One method of protecting against ROP attacks is address space layout randomization (ASLR). In ASLR, every time the program is run, component are randomly moved to different addresses in the virtual memory. In vehicle systems, there are cases in which the random access memory (RAM) size is limited and as a result there is not enough RAM to run a binary from the RAM. Therefore, in such cases, the binary is run in a flash memory. Flash memory has limitations to the number of times it can be rewritten. Thus, ASLR can be performed only a limited amount of times and thus is not a good solution. Additionally, it takes time to write to the flash memory and therefore rewriting the program into random memory locations at boot time will add an undesired latency.

What is desired, and not provided by the prior art, is a way of protecting against ROP attacks without having to perform ASLR.

SUMMARY OF THE INVENTION

Accordingly, it is a principal object of the present invention to overcome at least some of the disadvantages of prior art ROP attack protection. This is provided in one embodiment by an ROP attack protection apparatus comprising: a first region of memory having stored therein a protection function, the first region of memory set as executable; and a second region of memory having stored thereon a plurality of operation functions, the second region of memory set as non-executable, wherein the protection function is arranged to: responsive to a call to one of the plurality of operation functions and further responsive to at least one predetermined rule, allow execution of the called operation function; and after receiving a return from the executed operation function, set the executed operation function as non-executable. In one embodiment, the plurality of operation functions comprises the called function and a caller function, the call to the called function received from the caller function, and wherein the protection function is further arranged to: responsive to the call, set the caller function as non-executable; responsive to the received return, allow execution of the caller function. In another embodiment, responsive to the at least one predetermined rule, the protection function is further arranged to determine whether a return address of the call is valid, wherein the allowance of the execution of the called operation function is responsive to the return address of the call being determined to be valid, and wherein, responsive to the return address of the call being determined to not be valid, the protection function is further arranged to: not allow the execution of the called operation function; and output a notification regarding the non-valid return address. In one further embodiment, the determination that the return address is valid comprises a determination that the return address is not within an address range of the protection function, and wherein the determination that the return address is not valid comprises a determination that the return address is within an address range of the protection function.

In one embodiment, the call to one of the plurality of operation functions comprises: a call to the protection function; and information regarding an address of the called function. In another embodiment, the allowance of the execution comprises defining a section of the second region of memory as being executable, wherein the setting the executed operation function as non-executable comprises defining the section of the second region of memory as being non-executable. In one further embodiment, the definition of the section of the second region of memory as being executable comprises overwriting a value of a first register with a first boundary of an address range of the operation function which is allowed to be executed and overwriting a value of a second register with a second boundary of the address range of the operation function which is allowed to be executed, wherein the definition of the section of the second region of memory as being non-executable is performed by the overwriting.

In one embodiment, the allowance of the execution comprises copying the called operation function to the first region of memory, wherein the setting the executed operation function as non-executable comprises deleting the executed operation function from the first region of memory.

Independently, a return-oriented programming (ROP) attack protection method is provided, the method comprising: providing a region of memory having stored therein a plurality of operation functions, the region of memory set as non-executable; responsive to a call to one of the plurality of operation functions and further responsive to at least one predetermined rule, allowing execution of the called operation function; and after receiving a return from the executed operation function, setting the executed operation function as non-executable.

In one embodiment, the plurality of operation functions comprises the called function and a caller function, the call to the called function received from the caller function, wherein the method further comprises: responsive to the call, setting the caller function as non-executable; and responsive to the received return, allowing execution of the caller function. In another embodiment, responsive to the at least one predetermined rule, the method further comprises: determining whether a return address of the call is valid, the allowance of the execution of the called operation function being responsive to the return address of the call being determined to be valid; responsive to the return address of the call being determined to not be valid, not allowing the execution of the called operation function and outputting a notification regarding the non-valid return address.

In one further embodiment, the allowing execution of the called operation function and the setting the executed operation function as non-executable is performed by a protection function, wherein the determining that the return address is valid comprises determining that the return address is not within an address range of the protection function, and wherein the determining that the return address is not valid comprises determining that the return address is within an address range of the protection function. In one yet further embodiment, the call to one of the plurality of operation functions comprises: a call to the protection function; and information regarding an address of the called operation function.

In one embodiment, the allowance of the execution comprises defining a section of the region of memory as being executable, and wherein the setting the executed operation function as non-executable comprises defining the section of the region of memory as being non-executable. In one further embodiment, the definition of the section of the region of memory as being executable comprises overwriting a value of a first register with a first boundary of an address range of the operation function which is allowed to be executed and overwriting a value of a second register with a second boundary of the address range of the operation function which is allowed to be executed, wherein the definition of the section of the region of memory as being non-executable is performed by the overwriting.

In another embodiment, the allowance of the execution comprises copying the called operation function to an executable region of memory, and wherein the setting the executed operation function as non-executable comprises deleting the executed operation function from the executable region of memory.

Independently, a return-oriented programming (ROP) attack protection apparatus is provided, the ROP attack protection apparatus comprising: a processor; a first region of memory having stored therein instructions which when read by the processor causes the processor to implement a protection function, the first region of memory set as executable; and a second region of memory having stored therein instructions which when read by the processor causes the processor to implement a plurality of operation functions, the second region of memory set as non-executable, wherein, responsive to a call and further responsive to at least one predetermined rule, the processor is arranged to implement the protection function to: allow execution of one of the operation functions; and set the executed operation function as non-executable after completion of the executed operation function.

In one embodiment, the plurality of operation functions comprises the called function and a caller function, the call to the called function received from the caller function, wherein the processor is further arranged to implement the protection function to: responsive to the call, set the caller function as non-executable; responsive to the received return, allow execution of the caller function. In another embodiment, responsive to the at least one predetermined rule, the processor is further arranged to implement the protection function to determine whether a return address of the call is valid, wherein the allowance of the execution of the called operation function is responsive to the return address of the call being determined to be valid, and wherein, responsive to the return address of the call being determined to not be valid, the processor is further arranged to implement the protection function to: not allow the execution of the called operation function; and output a notification regarding the non-valid return address. In one further embodiment, the determination that the return address is valid comprises a determination that the return address is not within an address range of the protection function, and wherein the determination that the return address is not valid comprises a determination that the return address is within an address range of the protection function.

In another embodiment, the call to one of the plurality of operation functions comprises: a call to the protection function; and information regarding an address of the called function. In one embodiment, the allowance of the execution comprises defining a section of the second region of memory as being executable, wherein the setting the executed operation function as non-executable comprises defining the section of the second region of memory as being non-executable. In one embodiment, the allowance of the execution comprises copying the called operation function to the first region of memory, wherein the setting the executed operation function as non-executable comprises deleting the executed operation function from the first region of memory.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how several forms of the invention may be embodied in practice. In the accompanying drawings.

DETAILED DESCRIPTION OF THE PREFERRED EMBODIMENTS

Figure 1:
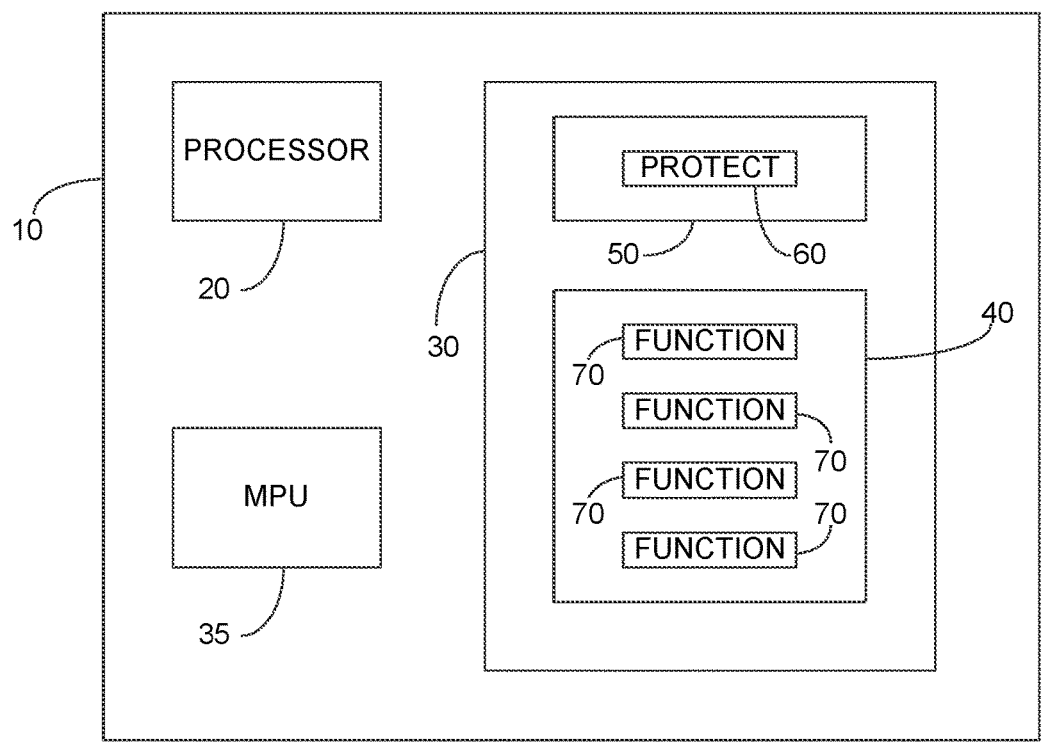
FIG. 1 illustrates a high level schematic diagram of a first embodiment of a program attack protection apparatus.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 illustrates a high level schematic diagram of an ROP attack protection apparatus 10. ROP attack protection apparatus 10 comprises: a processor 20; a memory protection unit (MPU) 25; and a memory 30. As known to those skilled in the art, MPU 25 is a hardware component which allows for setting predefined memory regions as non-executable. Particularly, code written in a non-executable memory region cannot be executed. Although for the sake of simplicity processor 20 and MPU 25 are illustrated as separate units, this is not meant to be limiting in any way and in one particular embodiment MPU 25 is implemented within processor 20. In one embodiment, processor 20 is a microprocessor. Memory 30 comprises: at least one non-executable region 40 set such that code stored therein cannot be executed by processor 20; and at least one executable region 50 set such that code stored therein can be executed by processor 20. In one embodiment, one or more dedicated registers record which memory regions are executable, while the remaining regions are non-executable, and the below is described in relation to such an embodiment. In another embodiment, the dedicated one or more registers record which memory regions are non-executable, while the remaining regions are executable. In another embodiment, one or more first dedicated registers record which memory regions are executable and one or more second dedicated registers record which memory regions are non-executable. MPU 25 sets memory regions to be non-executable responsive to the values of the dedicated registers. In one embodiment, memory 30 is a flash memory, i.e. a computer storage medium which can be electrically erased and reprogrammed.

As will be further described below, a protection function 60 is stored in executable region 50 and a plurality of operation functions 70 are stored in non-executable region 40. The term operation function, as used herein, is meant as any function which performs any type of operation, without limitation. For the sake of clarity, an operation function 70 which is calling another operation function 70 is termed herein as a caller operation function 70. Similarly, an operation function 70 being called is termed herein as a callee operation function 70. Additionally, interrupt functions and initializing commands are stored in executable region 50. In another embodiment, the interrupt functions and initializing commands are stored on a separate executable region 50, different than where operation functions 70 are stored. Each of protection function 60, operation functions 70, interrupt functions and initializing commands comprises computer readable instructions, which when read by processor 20 are arranged to cause processor 20 to perform the respective operations.

As will be described further below, any call to an operation function 70 goes to protection function 60. In one embodiment, after enablement of protection function 60 by an initiation code, in the event that the caller function is an operation function 70 stored in non-executable region 40, protection function 60 sets caller operation function 70 as non-executable. Particularly, in one embodiment, protection function 60 adjusts the value of a particular register such that MPU 25 sets the section of non-executable region 40 containing caller operation function 70 as being non-executable.

Protection function 60 is arranged to detect anomalies in the calls to operation functions 70, in accordance with at least one predetermined rule of a protection model. Responsive to a call to a callee operation function 70, such as by a main function, and responsive to the at least one predetermined rule, protection function 60 analyzes the return address stored on the call stack to determine whether it is a valid return command. Particularly, in an embodiment where all functions are stored in non-executable region 40 of memory 30, protection function 60 checks whether the return address is the same address as that of protection function 60. In the event that an attacker causes a stack overflow attack to hijack a return address, it can't jump to any operation function 70 because they are all set as being non-executable and any attempt to jump to any operation function 70 will cause an exception. However, the return address can be hijacked in order to jump to protection function 60. Therefore, if the return address is to protection function 60, an attack is identified. In an embodiment where one or more operation functions 70 are arranged to return to protection function 60, instead of another operation function 70, protection function 60 will allow the return.

In an embodiment where not all functions are stored in non-executable region 40, and therefore return addresses can be hijacked to jump to other functions, protection function 60 compares the return command to predetermined parameters to determine whether the call is within legitimate parameters, e.g. whether the callee operation function 70 is allowed to return data to that address. In one further embodiment, protection function 60 determines that the return is valid only if the return address is within the address range of caller operation function 70. Thus, the at least one predetermined rule comprises the above described parameters which determine whether the return address is valid.

In the event that the call is determined as being valid, protection function 60 allows callee operation function 70 to be executed. Particularly, in one embodiment, protection function 60 adjusts the value of a particular register such that MPU 25 sets the section of non-executable region 40 containing callee operation function 70 as being executable. In the event that the call is determined as not being valid, protection function 60 does not allow callee operation function 70 to be executed and an exception is generated. In one embodiment, protection function 60 generates a notification indicating the invalid call and outputs the notification to a predetermined output.

In another embodiment, even if all functions are set as non-executable, protection function 60 checks whether the return address is to the caller operation function 70. In the event that the return address is invalid, protection function 60 generates a notification with the details of invalid return.

The return of callee operation function 70, i.e. the data returned by callee operation function 70, is received by protection function 60. Responsive to receiving the return message, protection function 60 sets callee operation function 70 as non-executable. Particularly, in one embodiment, protection function 60 adjusts the value of a particular register to thereby define the section of non-executable region 40 containing callee operation function 70 as being non-executable. Additionally, protection function 60 allows execution of caller operation function 70. As described above, in one embodiment, protection function 60 adjusts the value of a particular register to thereby define the section of non-executable region 40 containing caller operation function 70 as being executable.

In summary, only a single operation function 70 is allowed to be executed at any given time. After generating a call, a caller operation function 70 is set as non-executable and the called operation function 70 is allowed to be executed only if the return address on the call stack is valid. After completing execution and returning the requested data, the called operation function 70 is set as non-executable and the caller operation function 70 is allowed to be executed again. Therefore, no ROP attacks can be implemented. Such a method of protection can be useful, among other applications, in protection of automobile data systems, such as those described in: international application publication WO 2018/037397, published Mar. 1, 2018; and U.S. provisional patent application 62/617,668, filed Jan. 16, 2018, the entire contents of each of which incorporated herein by reference.

In one non-limiting embodiment, where ROP attack protection apparatus 10 is implemented in a TriCore microcontroller, commercially available from Infineon Technologies AG of Neubiberg, Germany, each executable range of addresses is stored in a dedicated pair of registers, a first register storing the address of the upper boundary of the executable range and a second register storing the address of the lower boundary of the executable range. A first register pair is used for defining the address range of protection function 60 and a second register pair is used for defining the address range of the operation function 70 which is currently allowed to be executed, as described above. The value of a control register is set such that both register pairs are set as defining executable ranges. Allowing an operation function 70 to be executed comprises overwriting the values of the second register pair with the address boundaries of the operation function 70 to be executed. In one embodiment, returning an executed operation function 70 to being non-executable is automatic when the register pair values are overwritten with the address range of the allowable operation function 70. Thus, in the above embodiment, executable ranges 50 are determined by the first and second register pairs. Initializing code and interrupt functions are defined as executable by the first register pair or by other register pairs. Any memory which is not defined by the register pairs as being executable are defined as non-executable region 40.

In another non-limiting embodiment, where ROP attack protection apparatus 10 is implemented in an MPC5777 microcontroller, commercially available from NXP Semiconductors N.V. of Eindhoven, Netherlands, there are 24 sets of adjustable memory ranges, 6 dedicated for code, 12 dedicated for memory and 6 which can be either for code or for memory. There are 5 registers: a first register for selecting which range is being configured; a second register for configuring the process ID; a third register for defining the upper boundary of the range; a fourth register for defining the lower boundary of the range; and a fifth register for determining whether the range is executable or non-executable. A first range is configured to include protection function 60 and a second range is configured to include the address range of an operation function 70 allowed to be executed, as described above. In one embodiment, allowing execution of an operation function 70 comprises: selecting the second range with the first register; overwriting the value in the third register with the upper boundary of the address range of the operation function 70; and overwriting the value in the fourth register with the lower boundary of the address ranged of the operation function 70. As described above, in such an embodiment, setting an operation function 70 as being non-executable occurs automatically when the register values are overwritten.

Figure 2:
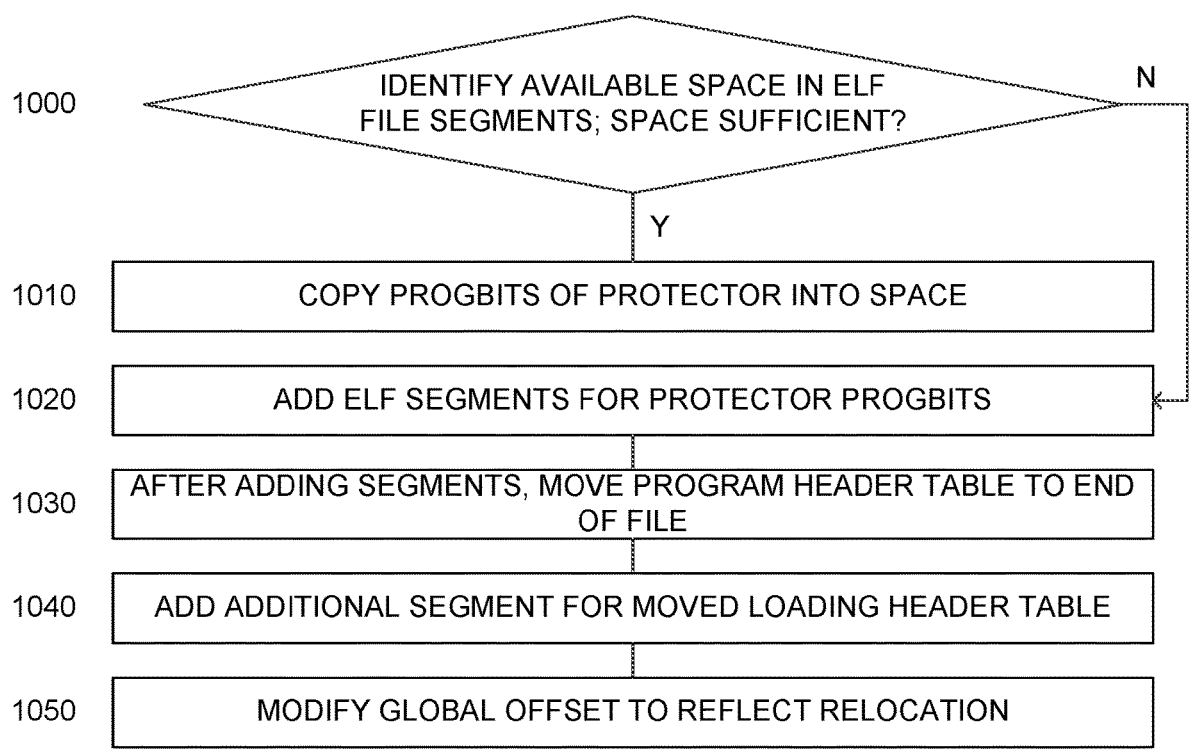
FIG. 2 illustrates a high level flow chart of a method of adding a predefined protection module to a binary program image, in accordance with certain embodiments.

FIG. 2 illustrates a high level flow chart of a method of adding a predefined protection module, such as protection function 60, to a binary program image when the source code is not available. The below is described in relation to an executable and linkable format (ELF) file. In stage 1000, the file is analyzed by a patching script to find available space which the protection functionality can fit into. In stage 1010, in the event that there is sufficient space within the existing segments, a portion of the PROGBITS, i.e. a portion of the program content, of the predefined protection module are copied into the binary program image within the space of stage 1000 by the patching script. In one embodiment, only the PROGBITS sections necessary to run the predefined protection module are copied in order to save space. While copying the PROGBITS of the predefined protection module into the binary program image, preferably the relative distance between different sections within the protection functionality is maintained. Particularly, sections of the ELF file which contain various types of data and are loaded on runtime need to be mapped to addresses in the CPU memory. The mapping is performed by segments, as known to those skilled in the art at the time of the invention. Each segment contains a sequence of consecutive PROGBITS sections which are loaded together to the address specified by the segment. Thus, the added segments for the protection functionality will load the added PROGBITS sections to the process address space on runtime.

In stage 1020, in the event that there isn't sufficient space within the existing segments, two new segments are added to the ELF file by the patching script. The first segment is for read-only executable text and the second segment is for read-write access. Sections of the protection functionality are then added to the added segments. Specifically, the read-write access PROGBITS sections comprise data and the global offset table (GOT).

All of the segments of the ELF file are listed in a program header table. After adding the two new segments of stage 1020, the program header table no longer fits in its original offset. Therefore, in stage 1030, the program header table is moved by the patching script to the end of the ELF file. In stage 1040, a third segment is added to the program header table by the patching script, the third segment arranged to load the program header table from its new location to the process address space on runtime to allow the process to be loaded and executed. Code is position independent, therefore relocation within the address space does not require any modifications as long as the relative distance between different sections is maintained. However, sometimes there are global offsets in the code. These offsets are stored in the GOT and in stage 1050 are modified by the patching script to reflect the relocation of the addresses. Thus, a new ELF file is generated, containing the original program and the predefined protection module.

Figure 3:
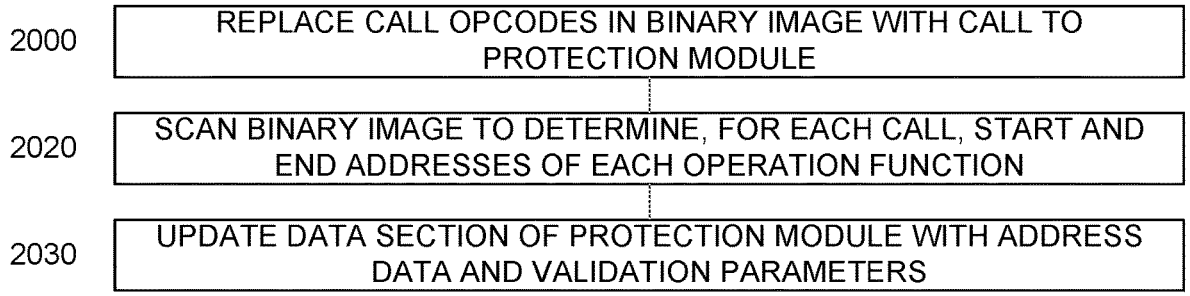
FIG. 3 illustrates a high level flow chart of a method of patching a binary image such that functions branch to the predefined protection module of FIG. 2.

FIG. 3 illustrates a high level flow chart of a method of patching a binary image, such as the generated ELF file of stages 1000-1050, so that functions branch to a predefined protection module, such as protection function 60 described above. In stage 2000, a patching script replaces call opcodes in the binary image with a call to the predefined protection module. For example, in an ARM instruction set, opcode POP is replaced with BL xxxxx, where xxxxx is the relative offset from the current frame pointer to the address of the predefined protection module. For cases where there is a complex instruction set, where the return opcodes can have different sizes, e.g. 16 or 32 bits, the return opcode is replaced with an invocation of a dedicated software interrupt which jumps to the predefined protection module. The new call to the predefined protection module contains the address of the original operation function which is being called. In one embodiment, all the call opcodes in the binary image are replaced. In another embodiment, a predetermined list of call opcodes are replaced.

In stage 2020, a training script scans the binary program image to determine, for each call, the start and end addresses of each caller and callee function, the addresses stored in the protection library. In stage 2030, the data section of the predefined protection module of stage 2000 is updated with address data and predetermined validation parameters.

Figure 4:
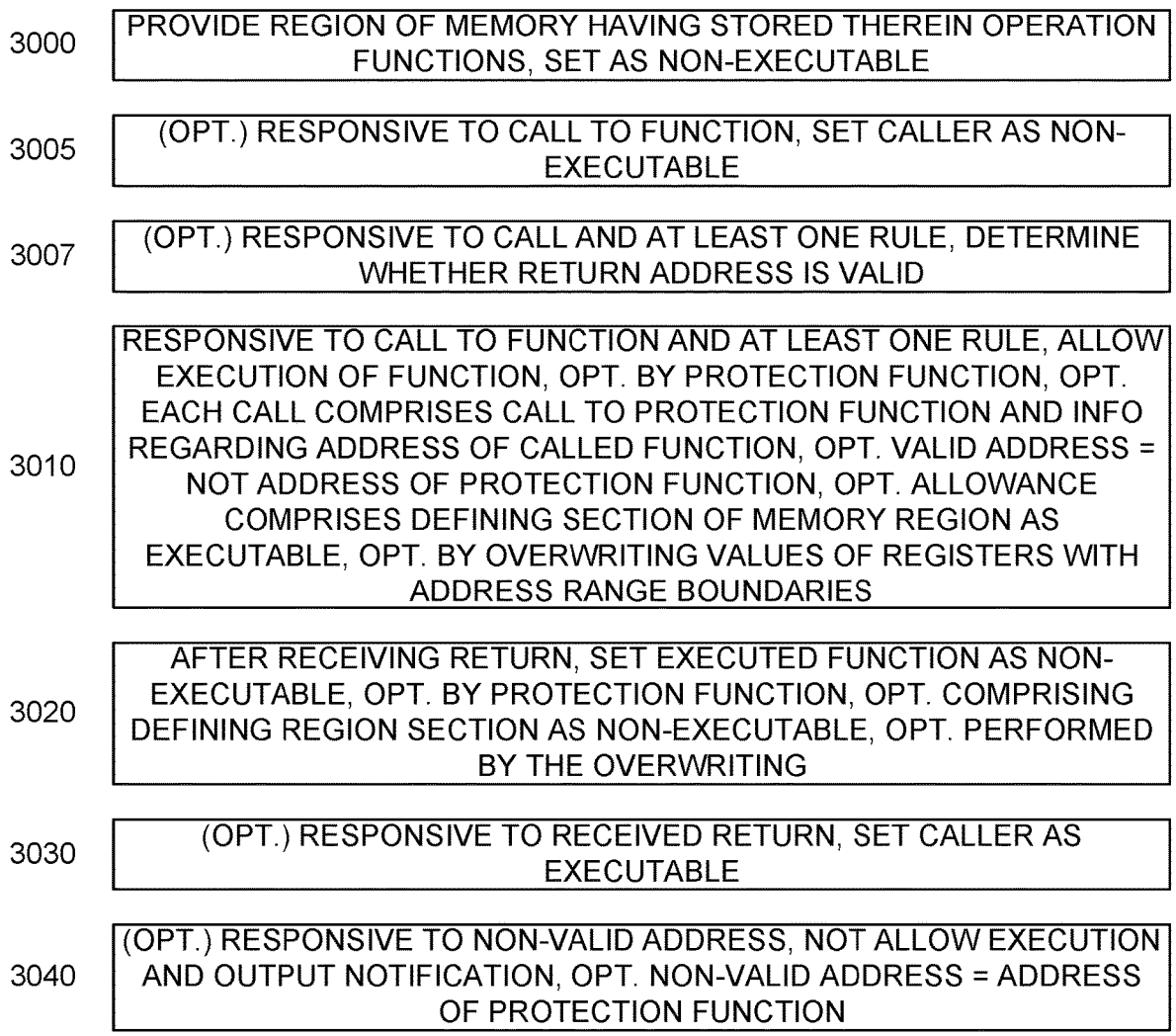
FIG. 4 illustrates a high level flow chart of a program attack protection method, in accordance with certain embodiments.

FIG. 4 illustrates a high level flow chart of an ROP attack protection method, in accordance with certain embodiments. In stage 3000, a region of memory having stored thereon a plurality of operation functions is provided, the region of memory set as non-executable. In optional stage 3005, in one embodiment a caller function is one of the plurality of operation functions. In such an embodiment, responsive to a call to one of the plurality of operation functions of stage 3000 by the caller function, the caller function is set as non-executable. In optional stage 3007, responsive to the call of optional stage 3005 and further responsive to the at least one predetermined rule of stage 3010 described below, a determination is performed to determine whether a return address of the call of optional stage 3005 is valid.

In stage 3010, responsive to a call to one of the plurality of operation functions of stage 3000, optionally the call of optional stages 3005 and 3007, and further responsive to at least one predetermined rule, execution of the called operation function is allowed. In one embodiment, the allowance of execution of the called operation of stage 3010, is responsive to the return address of the call being determined as valid. In one embodiment, the allowance of execution is performed by a protection function. Particularly, in one embodiment, each call to an operation function comprises a call to the protection function and information regarding an address of the called operation function. In one embodiment, the determining that the return address is valid comprises determining that the return address is not within an address range of the protection function of stage 3010. In another embodiment, the allowance of execution comprises defining a section of the region of memory of stage 3000 as being executable, the section comprising the address range of the allowed operation function. In one further embodiment, defining the section as being executable comprises overwriting a value of a first register with a first boundary of an address range of the operation function which is allowed to be executed and overwriting a value of a second register with a second boundary of the address range of the operation function which is allowed to be executed.

In stage 3020, after receiving a return from the executed operation function of stage 3010, the executed operation is set as non-executable. In one embodiment, setting the executed operation function as non-executable is performed by a protection function. In another embodiment, setting the executed operation as non-executable comprises defining the section of stage 3010 as being non-executable, the section comprising the address range of the executed operation function. In one further embodiment, defining the section as being non-executable is performed automatically by the overwriting of stage 3010. In optional stage 3030, responsive to the received return of stage 3020, execution of the caller function of stage 3005 is allowed.

In optional stage 3040, responsive to the return address of the call of stage 3010 being determined as not valid, the execution of the called operation of stage 3010 is not allowed and a notification regarding the non-valid return address is output. In one embodiment, the determining that the return address is not valid comprises determining that the return address is within an address range of the protection function of stage 3010.

Figure 5:
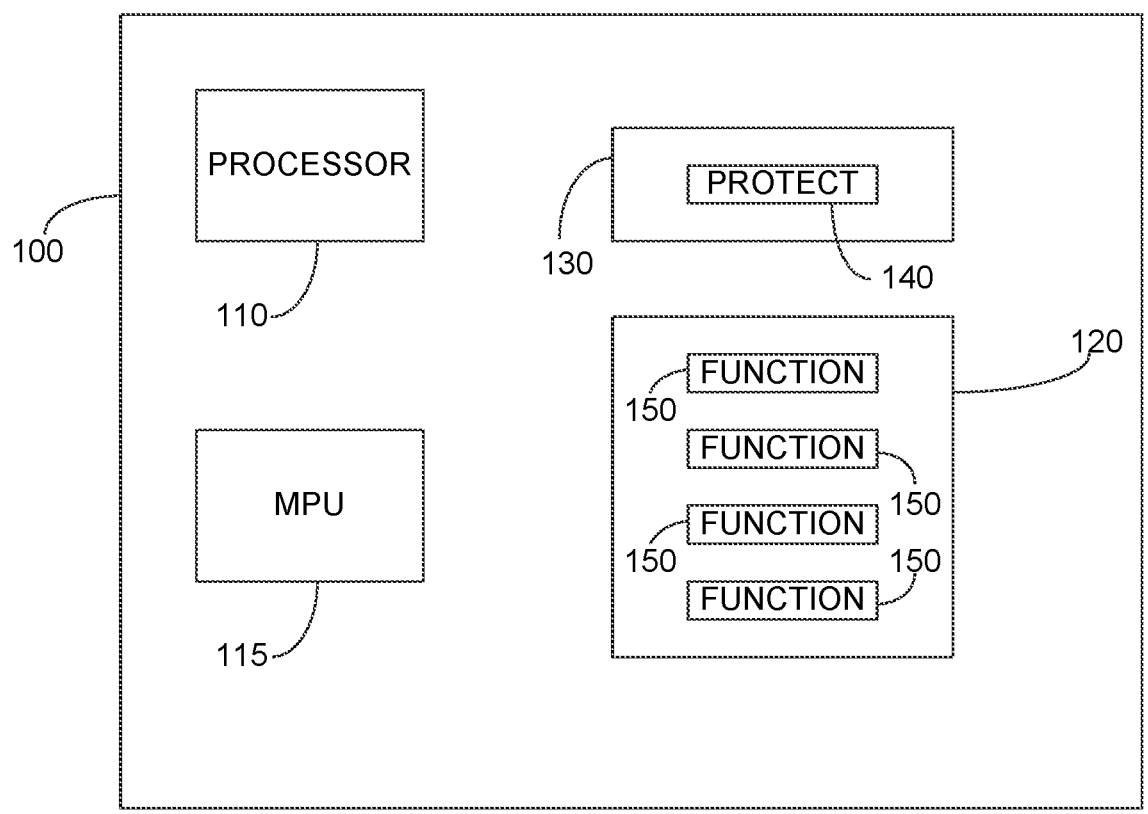
FIG. 5 illustrates a high level schematic diagram of a second embodiment of a program attack protection apparatus

FIG. 5 illustrates a high level schematic diagram of an ROP attack protection apparatus 100, in accordance with certain embodiments. ROP attack protection apparatus 100 is used instead of ROP attack protection apparatus 10 when access to the MPU is not allowed during runtime, such as in safety related vehicle system components. ROP attack protection apparatus 100 comprises: a processor 110; an MPU 115; a memory 120; and a memory 130. Memory 120, or a predetermined region thereof, is set by MPU 115 as non-executable, as described above. Memory 130, or a predetermined region thereof, is executable. In one embodiment, memory 120 is a flash memory. In another embodiment, memory 130 is a RAM. In one embodiment, memory 130, or the executable region thereof, has stored therein a protection function 140. As described above, interrupt functions and initializing commands are stored in executable memory 130. Memory 120, or the non-executable region thereof, has stored therein a plurality of operation functions 150. In another embodiment, memory 120 exhibits an executable region and a non-executable region. In such an embodiment, the executable region has stored therein protection function 140 and the non-executable region has stored therein the plurality of operation functions 150. Each of protection function 140, operation functions 150, interrupt functions and initializing commands comprises computer readable instructions, which when read by processor 110 are arranged to cause processor 110 to perform the respective operations.

The operation of protection function 140 is in all respects similar to the operation of protection function 60, with the exception that allowing execution of an operation function 150 comprises copying the operation function 150 to memory 130 and setting the operation function 150 as non-executable comprises deleting the operation function 150 from memory 130. Particularly, an operation function 150, such as a main function, is initiated on memory 130 and calls a callee operation function 150. Responsive to the return address of the call being determined as valid, protection function 140 deletes caller operation function 150 from memory 130 and copies callee operation function 150 to memory 130 where it can be executed. Upon receiving the return message from callee operation function 150, protection function 140 deletes callee operation function 150 from memory 130 and copies caller operation function 150 back to memory 130. Protection function 140 additionally transmits the return message to the return address in caller operation function 150.

In order to avoid security risks due to having a memory region which is both writable and executable, preferably protection function 140 is defined as the only process which can write to memory 130. For example, in the MPC574XG, commercially available from NXP Semiconductors N.V. of Eindhoven, Netherlands, such a definition can be accomplished with the following code:
SMPU1.RGD[1].WORD4.B.PID=0x1;
SMPU1.RGD[1].WORD4.B.PIDEN=0x1; //enable PID
SMPU 1.RGD[1].WORD5.B.VLD=0x1; //enable descriptor [0]
This allows only the process ID 1 to write to the predefined region of memory 130. In protection functionality 140, the code defines protection functionality as process ID 1, thereby defining that only protection functionality 140 can write to the region of memory 130:
_MTSPR(SPR_PID,1);

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination. In particular, the invention has been described with an identification of each powered device by a class, however this is not meant to be limiting in any way. In an alternative embodiment, all powered device are treated equally, and thus the identification of class with its associated power requirements is not required.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. A return-oriented programming (ROP) attack protection apparatus comprising:
a first region of memory having stored therein a protection function, said first region of memory set as executable; and
a second region of memory having stored therein a plurality of operation functions, said second region of memory set as non-executable,
wherein said protection function is arranged to:
responsive to a call to one of said plurality of operation functions and further responsive to at least one predetermined rule, allow execution of said called operation function; and
after receiving a return from said executed operation function, set said executed operation function as non-executable,
wherein said plurality of operation functions comprises said called function and a caller function, said call to said called function received from said caller function,
wherein said protection function is further arranged to:
responsive to said call, set said caller function as non-executable;
responsive to said received return, allow execution of said caller function,
wherein responsive to said at least one predetermined rule, said protection function is further arranged to determine whether a return address of said call is valid,
wherein said allowance of said execution of said called operation function is responsive to said return address of said call being determined to be valid, and
wherein, responsive to said return address of said call being determined to not be valid, said protection function is further arranged to:
not allow said execution of said called operation function; and
output a notification regarding the non-valid return address.

2. The ROP attack protection apparatus of claim 1, wherein said determination that the return address is valid comprises a determination that the return address is not within an address range of said protection function, and wherein said determination that the return address is not valid comprises a determination that the return address is within an address range of said protection function.

3. The ROP attack protection apparatus of claim 1, wherein said call to one of said plurality of operation functions comprises:
a call to said protection function; and
information regarding an address of said called function.

4. The ROP attack protection apparatus of claim 1, wherein said allowance of said execution comprises defining a section of said second region of memory as being executable, and
wherein said setting said executed operation function as non-executable comprises defining said section of said second region of memory as being non-executable.

5. The ROP attack protection apparatus of claim 4, wherein said definition of said section of said second region of memory as being executable comprises overwriting a value of a first register with a first boundary of an address range of said operation function which is allowed to be executed and overwriting a value of a second register with a second boundary of the address range of said operation function which is allowed to be executed, and
wherein said definition of said section of said second region of memory as being non-executable is performed by said overwriting.

6. The ROP attack protection apparatus of claim 1, wherein said allowance of said execution comprises copying said called operation function to said first region of memory, and
wherein said setting said executed operation function as non-executable comprises deleting said executed operation function from said first region of memory.

7. A return-oriented programming (ROP) attack protection method, the method comprising:
providing a region of memory having stored therein a plurality of operation functions, the region of memory set as non-executable;
responsive to a call to one of the plurality of operation functions and further responsive to at least one predetermined rule, allowing execution of the called operation function; and
after receiving a return from the executed operation function, setting the executed operation function as non-executable,
wherein the plurality of operation functions comprises the called function and a caller function, the call to the called function received from the caller function,
wherein the method further comprises:
responsive to said call, setting the caller function as non-executable; and
responsive to said received return, allowing execution of the caller function, and
wherein responsive to said at least one predetermined rule, the method further comprises:
determining whether a return address of said call is valid, said allowance of said execution of the called operation function being responsive to the return address of the call being determined to be valid;
responsive to the return address of the call being determined to not be valid, not allowing said execution of the called operation function and outputting a notification regarding the non-valid return address.

8. The ROP attack protection method of claim 7, wherein said allowing execution of the called operation function and said setting the executed operation function as non-executable is performed by a protection function, wherein said determining that the return address is valid comprises determining that the return address is not within an address range of the protection function, and wherein said determining that the return address is not valid comprises determining that the return address is within an address range of the protection function.

9. The ROP attack protection method of claim 8, wherein the call to one of said plurality of operation functions comprises:
a call to said protection function; and
information regarding an address of the called operation function.

10. The ROP attack protection method of claim 7, wherein said allowance of said execution comprises defining a section of the region of memory as being executable, and
wherein said setting the executed operation function as non-executable comprises defining the section of the region of memory as being non-executable.

11. The ROP attack protection method of claim 10, wherein said definition of the section of the region of memory as being executable comprises overwriting a value of a first register with a first boundary of an address range of the operation function which is allowed to be executed and overwriting a value of a second register with a second boundary of the address range of the operation function which is allowed to be executed, and
wherein said definition of the section of the region of memory as being non-executable is performed by said overwriting.

12. The ROP attack protection method of claim 7, wherein said allowance of said execution comprises copying the called operation function to an executable region of memory, and
wherein said setting the executed operation function as non-executable comprises deleting the executed operation function from the executable region of memory.

13. A return-oriented programming (ROP) attack protection apparatus comprising:
a processor;
a first region of memory having stored therein instructions which when read by said processor causes said processor to implement a protection function, said first region of memory set as executable; and
a second region of memory having stored therein instructions which when read by said processor causes said processor to implement a plurality of operation functions, said second region of memory set as non-executable,
wherein, responsive to a call and further responsive to at least one predetermined rule, said processor is arranged to implement said protection function to:
allow execution of one of said operation functions; and
set said executed operation function as non-executable after completion of said executed operation function,
wherein said plurality of operation functions comprises said called function and a caller function, said call to said called function received from said caller function,
wherein said processor is further arranged to implement said protection function to:
responsive to said call, set said caller function as non-executable;
responsive to said received return, allow execution of said caller function,
wherein responsive to said at least one predetermined rule, said processor is further arranged to implement said protection function to determine whether a return address of said call is valid,
wherein said allowance of said execution of said called operation function is responsive to said return address of said call being determined to be valid, and
wherein, responsive to said return address of said call being determined to not be valid, said processor is further arranged to implement said protection function to:
not allow said execution of said called operation function; and
output a notification regarding the non-valid return address.

14. The ROP attack protection apparatus of claim 13, wherein said determination that the return address is valid comprises a determination that the return address is not within an address range of said protection function, and
wherein said determination that the return address is not valid comprises a determination that the return address is within an address range of said protection function.

* * * * *